US012444982B2

(12) United States Patent
Forrest et al.

(10) Patent No.: US 12,444,982 B2
(45) Date of Patent: Oct. 14, 2025

(54) MAGNET SHIELDING BY USING A MAGNETISABLE PLATE

(71) Applicant: GN Hearing A/S, Ballerup (DK)

(72) Inventors: Alexander Wildt Forrest, Copenhagen (DK); Emil Holm Knudsen, Copenhagen (DK); Michael Sean James Tanswell, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 869 days.

(21) Appl. No.: 17/530,349

(22) Filed: Nov. 18, 2021

(65) Prior Publication Data
US 2022/0200348 A1    Jun. 23, 2022

(30) Foreign Application Priority Data
Dec. 23, 2020 (DK) .............................. PA202070872

(51) Int. Cl.
*H02J 50/12*      (2016.01)
*H02J 7/00*       (2006.01)
(Continued)

(52) U.S. Cl.
CPC ............ *H02J 50/12* (2016.02); *H02J 7/0042* (2013.01); *H04R 1/1025* (2013.01); *H04R 25/556* (2013.01)

(58) Field of Classification Search
CPC .. H04R 1/1016; H04R 1/1025; H04R 25/556; H02J 7/0044; H02J 50/10; H02J 50/70;
(Continued)

(56) References Cited

U.S. PATENT DOCUMENTS 7,620,195 B2 * 11/2009 Bengtsson ........... H04R 25/305
                                                   381/322
9,967,648 B2 *  5/2018 Panecki ................ B65D 25/02
                       (Continued)

FOREIGN PATENT DOCUMENTS

CN       204090096      1/2015
CN       209345367      9/2019
                (Continued)

OTHER PUBLICATIONS

Extended European Search Report for EP Patent Appln. No. 21212288.1 dated May 13, 2022.
(Continued)

*Primary Examiner* — Richard V Muralidar
(74) *Attorney, Agent, or Firm* — Vista IP Law Group, LLP

(57) ABSTRACT

Disclosed is a system comprising a hearing device and a charging device. The charging device is configured for receiving the hearing device and for charging the hearing device. The hearing device comprises a hearing device magnet and a receiving charging element. The charging device comprises a charging device magnet and a supplying charging element. The hearing device magnet and the charging device magnet are configured for retaining the hearing device in the charging device when charging. The supplying charging element is configured for performing the charging of the hearing device. The system comprises a magnetisable plate provided between the hearing device magnet and the charging device magnet, when the hearing device is received in the charging device.

20 Claims, 5 Drawing Sheets (a)

(b)

(51) Int. Cl.
  *H04R 1/10* (2006.01)
  *H04R 25/00* (2006.01)

(58) Field of Classification Search
  CPC .. H02J 50/40; H02J 50/90; H02J 50/12; H02J 7/0042; A45C 2011/001
  USPC .................................................. 320/114, 115
  See application file for complete search history.

(56) References Cited

U.S. PATENT DOCUMENTS

| | | | |
|---|---|---|---|
| 10,701,472 B1* | 6/2020 | Xu | ......................... H02J 7/0044 |
| 2012/0237074 A1 | 9/2012 | Aase | |
| 2013/0315431 A1 | 11/2013 | Grinker et al. | |
| 2017/0093453 A1* | 3/2017 | Panecki | ............... H01R 13/521 |
| 2017/0107100 A1 | 4/2017 | Cheng et al. | |
| 2018/0129078 A1* | 5/2018 | Blum | ...................... G02C 5/146 |
| 2020/0107100 A1 | 4/2020 | Stanley et al. | |
| 2020/0221212 A1* | 7/2020 | Xu | ......................... H02J 7/0045 |
| 2022/0200348 A1* | 6/2022 | Forrest | .................... H02J 50/12 |

FOREIGN PATENT DOCUMENTS

| | | |
|---|---|---|
| CN | 110602581 | 12/2019 |
| CN | 111628553 | 9/2020 |
| EP | 2441625 A1 | 4/2012 |
| EP | 2677767 A2 | 6/2013 |
| EP | 3151584 | 4/2017 |
| EP | 3151584 A2 | 4/2017 |
| WO | WO 2020/017128 | 1/2020 |

OTHER PUBLICATIONS

Search Report for EP Patent No. 3151584 dated Jun. 27, 2017.
Examination report for Danish patent application No. PA 2020 70872 dated Jun. 23, 2021.
Foreign Intent to Grant for Danish Patent Appln. No. PA 2020 70872 dated May 10, 2022.
Foreign Technical Examination for Danish Patent Appln. No. PA 2020 70872 dated May 5, 2022.
Foreign Technical Examination for Danish Patent Appln. No. PA 2020 70872 dated Jul. 21, 2022.
Foreign Technical Examination for Danish Patent Appln. No. PA 2020 70872 dated Dec. 15, 2021.

* cited by examiner

MAGNET SHIELDING BY USING A MAGNETISABLE PLATE

RELATED APPLICATION DATA

This application claims priority to, and the benefit of, Danish Patent Application No. PA 2020 70872 filed on Dec. 23, 2020. The entire disclosure of the above application is expressly incorporated by reference herein.

FIELD

The present disclosure relates to a system and chargeable devices forming part of the system and comprising a magnet for holding devices together during charging.

BACKGROUND

Rechargeable hearing aids are gaining popularity because they require low maintenance compared to traditional hearing aids with alkaline batteries. The rechargeable hearing aids do not generate an extra cost for a user, as there is no need for purchasing a new battery every time an old battery is drained. Furthermore, the rechargeable hearing aids have other benefits, they are watertight, robust, environmentally friendly, and allow for new architectures. The rechargeable hearing devices are typically charged wirelessly.

Wireless charging has various advantages, it is simple as a charging device may simply be placed at a charging pad. Furthermore, mechanical strain on a charging port is reduced, as there is no plug to be plugged and unplugged every time. Additionally, wireless charging is constantly growing so it will be more and more common that wireless charging pads will be installed in various places so that users can simply drop their device for charging. This applies to standard devices which do not require special, i.e. custom, types of charging pads.

On the other hand, wireless charging is in general slower than wired charging as, often, a charging device and a charger may not have a good energy transfer due to low efficiency, and especially if the charging device has a special shape, like a hearing device. Due to their specific shape, hearing devices may require a charging station, and not a simple charging pad. Therefore, there is a need for ensuring optimal charging of a hearing device in a charger, while shielding magnet(s) which hold the hearing device in place in the charging system.

SUMMARY

It is an object of embodiments to provide a hearing device/charger system with an improved attraction force between the hearing device and charger during charging of the hearing device.

It is a further object to provide a hearing device/charger system with magnets shielded from outside impacts.

It is also an object to eliminate any user risk related to coming into contact with magnets of a hearing device/charger system.

It is a further object to provide a hearing device with a reduced size.

It is also an object to provide a corresponding charging device with a reduced size.

It is yet another object to provide a hearing device/charger system with optimized charging capabilities.

In a first aspect, a system comprising a hearing device and a charging device is disclosed. The charging device is configured for receiving the hearing device and for charging the hearing device. The hearing device comprises a hearing device magnet and a receiving charging element. The charging device comprises a charging device magnet and a supplying charging element. The hearing device magnet and the charging device magnet are configured for retaining the hearing device in the charging device when charging. The supplying charging element is configured for performing the charging of the hearing device. The system comprises a magnetisable plate provided between the hearing device magnet and the charging device magnet, when the hearing device is received in the charging device.

The hearing device may be a headset, a hearing aid, an earbud, or similar. The system may comprise two hearing devices having similar features and characteristics. One hearing device may fit the user's right ear and the other may fit the user's left ear. Alternatively, both hearing aids may be formed such to fit both ears of the user. The two hearing devices may be mechanically connected or wirelessly connected to each other or they may be two completely separate devices. The hearing device may be a cordless rechargeable electronic device which may be charged exclusively by the charging device. The charging device represents a charger configured for receiving the hearing device. Namely, the hearing device can be placed in the charger, i.e. a charger case. The charger case would normally form one or two cavities or shells having a negative geometry of the one of the hearing device such that the hearing device(s) can be placed in the formed cavity/cavities. The hearing device may at least partly be received in the charger cavity. The charging device is configured for charging the hearing device. The charger itself may be in a form of a rechargeable battery which charges the hearing device or it may be in the form of a device which charges the hearing device while plugged in an electric socket.

The hearing device comprises a hearing device magnet. The magnet is typically placed in a hearing device housing together with other components of the hearing device such as a printed circuit board, speaker, an antenna, microphone, and similar. Typically, the magnet is placed close to the surface where the hearing device engages with the charger device. The magnet may be covered by the housing material and not exposed to the surroundings. If there are two hearing devices, each device may comprise a magnet. The hearing device may be a square magnet, a cylindrical magnet, ellipsoidal magnet or similar. The shape of the magnet normally depends on the size of the hearing device housing and other components arranged therein. As the rechargeable hearing devices have a small size, there are tight space requirements and there is a constant trend towards miniaturization of all hearing devices components, including the magnet. The magnet may have a diameter in the range of millimeters.

The hearing device also comprises a receiving charging element. The receiving charging element receives electrical charges from the charger which provides electricity to this portable hearing device. The receiving charging element may be configured for conductive charging. The conductive charging uses conductive power transfer. The conductive charging element may be a conductor, and in particular in a form of a flat metallic contact plate configured to get in contact with the tip of the supplying charging element which may be in the form of a pogo pin. Alternatively, the receiving charging element may be configured for inductive charging and be in a form of an induction coil optionally assisted by a capacitor. In this case, energy is transferred through inductive coupling. If there are two hearing devices in the system, each hearing device comprises the receiving charging element.

Similarly, the charging device comprises a charging device magnet typically placed in the cavity configured for receiving the hearing device. The magnet has its own persistent magnetic field attracting the corresponding magnet in the hearing device. The charging device magnet may have similar diameter as the hearing device magnet. Similar to the hearing device magnet, the charger magnet may be placed at the surface of the charger cavity such as to face the hearing device magnet when the hearing device is placed in the cavity. Placing the two magnets close to each other and aligning them ensures good attraction force between the hearing device and the charger. The charger may comprise two magnets if the system comprises two hearing devices, i.e. one magnet for each hearing device. However, it is also possible that the charger comprises one magnet positioned and sized appropriately to ensure desirable retention of both hearing devices.

The charging device also comprises a supplying charging element. The supplying charging element supplies electrical charges to the hearing device, thereby providing electricity to the portable hearing device. Namely, the supplying charging element is configured for performing the charging of the hearing device by connection to the receiving charging element. The supplying charging element may be configured for conductive charging. The supplying charging element may be a conductor, and in particular in a form of a pogo pin or spring-loaded pin. Alternatively, the supplying charging element may be configured for inductive charging and be in a form of an induction coil optionally assisted by a capacitor. In this case energy is transferred through inductive coupling. The supplying charging element and the receiving charging element are configured for the same type of power transfer. If there are two hearing devices in the system, the charging device comprises two supplying charging elements, one for each of the two hearing devices. The supplying charging element is normally aligned with the receiving charging element in order to achieve efficient charging. The supplying charging element may be positioned close to the charging device magnet, and similarly, the receiving charging element may be positioned close to the hearing device magnet.

The hearing device magnet and the charging device magnet are configured for retaining the hearing device in the charging device when charging. In order to maximize the attraction force between the two magnets, the magnets may be placed as close as it is allowed by the geometry of the hearing device and the charger device. Additionally, the magnets may be placed in alignment as much as it is allowed by the geometry of the hearing and charging device. Additionally, the magnets ensure compression of the pogo pins during charging, or, in the case of inductive charging, the retention force generated by the magnets ensures close and tight contact between the hearing device and the charger thereby improving efficiency of the inductive charging.

The system comprises a magnetisable plate. The magnetisable plate is as a plate which exhibits induced magnetic properties when placed in proximity of a magnet. When placed close to the magnets of the system, the plate magnetizes and influences the magnetic field between the magnets such that the magnetic attraction between the magnets increases. Namely, the magnetisable plate guides the field between the magnets acting as a lens such that the field is focused from one device to another. The plate may be an element substantially shaped as the hearing device magnet and/or as the charging device magnet. It may have an oval, circular, square, rectangular, ellipsoidal, triangular, or a similar shape. Typically, the thickness of the plate is smaller than the width or depth of the plate.

The magnetisable plate is provided between the hearing device magnet and the charging device magnet, when the hearing device is received in the charging device. Namely, when the hearing device is placed in the charger, the two magnets may be aligned and the plate may be positioned such that it is also aligned with the magnets. Thereby the plate affects the field intensity between the magnets. At the same time it shields at least one of the magnets as it may be placed in a direct contact with at least one magnet and at the surface facing the other magnet. The magnetisable plate does not require additional space for shielding the magnets as it may be arranged to be in a direct contact with the magnets of the hearing device and/or the charging device. The magnetisable plate protects the magnets from outside impacts. Additionally, the magnetisable plate enhances attraction force between the magnets. There may be no other material between the hearing device magnet and the charger magnet than the magnetisable plate.

The magnetisable plate may be arranged, placed, or located at a first surface where the hearing device magnet and the charging device magnet are facing each other such that if forms part of either the hearing device or of the charging device. In this case, the first surface would be defined by either the hearing device or by the charger. In prior art hearing devices and chargers, the magnets are placed close to the surface of the devices and covered and protected by plastic forming the housing of the hearing device or charger. This plastic, regardless of how thin it can be manufactured, disturbs the magnetic field between the magnets and weakens it. According to some embodiments, the plastic covering the magnets may be removed and the magnetisable plate can be placed instead. In this case, the magnetisable plate serves as a cover and protection for the magnets. This can be done on the hearing device and/or on the charging device. The magnetisable plate may also protect the user from direct contact with the magnets which reduces the risk of allergies, etc.

The magnetisable plate placed and dimensioned precisely increases attraction force between the hearing device and charger during charging of the hearing device. The increased attraction force between the magnets provides a number of benefits for the charging system. At first, the magnetisable plate shields the magnets from outside impacts and eliminates any user's risk related to coming into contact with magnets of the system. Increased attraction force allows for size reduction of one or both magnets of the system what further allows for miniaturization of the devices or possibly adding additional functionalities to the system by utilizing space saved by the smaller magnets.

Furthermore, by increasing the magnetic force between the two magnets, the hearing device is firmly placed in the charger. Stable position and tight compression between the hearing device and the charger increases compression and proximity of charging elements and thereby efficiency of charging is improved.

In some embodiments, the magnetisable plate may be provided in the charging device. The magnetisable plate may be in a direct contact with the charging device magnet and arranged towards the hearing device when the hearing device is placed in the charger. Normally, the charging device magnet is protected from outside impacts by a material forming a charging device case. It is normally a molded plastics material. According to some embodiments, a portion of the material covering the charging magnet may be removed and the magnetisable plate may be arranged instead. Providing the magnetisable plate instead of the cover material in the charging device, the magnet is still shielded while the distance between the magnets of the hearing device and the charger is not increased. At the same time, the attraction force between the magnets is increased thanks to the properties of the magnetisable plate which focuses the magnetic field between the magnets. At the attraction force is increased, the size of one of the magnets can be reduced. Reducing the size of the magnet may result in the size reduction of the entire device.

In some embodiments, the magnetisable plate may be provided in the hearing device. The magnetisable plate may be in a direct contact with the hearing device magnet and arranged towards the charging device when the hearing device is placed in the charger. Normally, the hearing device magnet is protected from outside impacts by a material forming a housing of the hearing device. It is normally a molded plastics material which, at the same time, protects a hearing device user from the electronic components and the magnet of the hearing device. According to some embodiments, a portion of the material covering the hearing device magnet may be removed and the magnetisable plate may be arranged instead. Providing the magnetisable plate instead of the cover material in the hearing device, the hearing device magnet is still shielded while the distance between the magnets of the hearing device and the charger is not increased. At the same time, the attraction force between the magnets is increased when the hearing device is placed in the charger due to the properties of the magnetisable plate which focuses and thereby increases the magnetic field between the magnets. Arranging the magnetisable plate in the hearing device provides the same benefits as when the magnetisable plate is arranged in the charging device.

In some embodiments, the magnetisable plate may have a smaller width than the width of the hearing device magnet or the charging device magnet. Namely, the magnetisable plate may not cover the entire surface of the magnets facing the other magnet but only a portion of that surface. For instance, the width of the plate may be 1% smaller than the width of the side of the magnet facing the other magnet. If the magnet is defined by its diameter, the magnetisable plate may have a smaller diameter than the corresponding magnet onto which it may be arranged. Additionally or alternatively, the area of the magnetisable plate may be at least 1% smaller than the area of the magnet facing the other magnet. Sizing the magnetisable plate ensures better focusing of the field between the magnets.

In some embodiments, the magnetisable plate may be configured to extend the magnetic field from the charging device magnet towards the hearing device magnet. The magnetic field is also extended from the hearing device towards the charging device. A correctly dimensioned magnetisable plate acting as a lens for the magnetic field between the devices will focus, extend, and guide the magnetic field resulting in increased attraction between the magnets. Focusing of the magnetic field can be achieved by manipulating dimensions of the plate, i.e. its width, thickness, depth and shape in general. The shape of the magnetisable plate may follow a general shape of the magnet onto which it is arranged. Even though the magnetisable plate creates a distance between the charging device magnet and the hearing device magnet, the magnetisable plate increases the magnetic retention, i.e. attraction force between the magnets.

In some embodiments, the magnetisable plate may have a width in the range between 0.5-3 mm. Typically, the magnet in the hearing device is about 3.1 mm wide, 2.3 mm deep and 1.5 mm tall, while the charging device magnet is about 3.1 mm wide, 2.3 mm deep, and 5.2 mm tall. The magnetisable plate is typically dimensioned such that it does not cover the entire surface of the magnet(s). The width of the plate may be at least 1% smaller than the width of the magnet to be plated and may cover at least 10% of the magnet in order to ensure extension of the magnetic field towards the other magnet. Therefore, the width of the magnetisable plate may be more than 3 mm if one of the magnets are wider than 3.1 mm. Also, if the magnets are smaller than 0.5 mm, the width of the plate may be smaller than 0.5 mm. The depth of the plate may be the same or smaller than the depth of the magnets. The thickness of the plate is typically 0.4 mm or less.

In some embodiments, the magnetisable plate may have a maximum relative magnetic permeability higher than 500. The relative magnetic permeability indicates how easily a material magnetises when subjected to a magnetic field. It is preferred to have a material used for the plate to have a relatively high permeability in order to ensure field extension between the two magnets. The magnetic field can be extended between the two magnets by placing a relatively thin magnetisable plate having a relative permeability of minimum 500. Such plate would ensure field extension and at the same time will ensure that the magnets remain close to each other.

The magnetisable plate may, in general, be a magnetisable, i.e. magnetic, metal. Magnetic metals include iron, nickel, cobalt and most of their alloys. Some forms of steel are magnetic. When selecting a material for the magnetisable plate care may be taken about selecting a material which is biologically compatible, non-corrosive, and medical grade material. Selection of such materials for shielding the magnets restricts or eliminates any user risk related to coming into contact with the magnets. Due to practical reasons and cost, applying steel plates is the most promising material to be used.

In some embodiments, the magnetisable plate may be a ferritic stainless steel or a martensitic stainless steel. Ferritic and martensitic stainless steel are two specific types of stainless steel alloy. Ferritic stainless steel properties include a maximum of 0.15% carbon and a minimum of 16% chromium, yielding very strong protection against corrosion. Martensitic stainless steel can be hardened and tempered through multiple ways of aging/heat treatment. It is a medical grade material widely used for medical tools with great corrosion resistance properties.

In one embodiment the plate may be made of a stainless steel grade 430 (S430). Grade 430 stainless steels is the most commonly used ferritic stainless steel, it is widely available and cheap. It can be in the form of a coil, sheet or plate. In some cases, S430 in the form of a plate may be used. All ferritic grades, such as stainless steel grade 430, have good stress corrosion cracking resistance and is not susceptible to stress corrosion cracking. Grade 430 has good corrosion resistance to numerous substances, such as certain organic acids and nitric acid and is useful in mildly corrosive conditions. Grade 430 has useful resistance to heat and oxidation. Grade 430 is also a medical grade material. This property is in particular important when it comes to hearing aids which normally come in a close contact with the user's skin. The relative magnetic permeability of S430 is in the range between 600 and 1800. In some embodiments, a stainless steel grade 416 may be used.

In some embodiments, the system may further comprise a non-magnetisable material provided between the hearing device magnet and the charging device magnet, and arranged adjacent to the magnetisable plate. The non-magnetisable material may be in the form of a plate and typically forms part of one of the hearing device and charging device which comprises the magnetisable plate. The non-magnetisable material may cover a portion of the magnet which is not covered by the magnetisable plate and may be arranged adjacent to the magnetisable plate. The non-magnetisable material may be a molded plastics material which forms the charger device and/or hearing device. The non-magnetisable material will not disturb the magnetic field between the magnets. It may only serve to hold the magnetisable plate in place. The magnetisable plate may be fitted into the non-magnetisable material. Similar to the magnetisable plate, the non-magnetisable material may be selected to have high resilience and toughness as well as to be biologically compatible and with low general reactiveness.

In some embodiments, the magnetisable plate may be provided between the hearing device magnet and the charging device magnet by arranging the magnetisable plate at a first surface, where the hearing device magnet and the charging device magnet are facing each other. Normally, the magnets of the charging device and the hearing device are aligned with each other so that maximum available magnetic force is exerted on the hearing device when placed in the charger. Such arrangement ensures that the hearing device is retained in the charging device and additionally compression of the charging elements is ensured during charging. The magnetisable plate may therefore be placed at the first surface between the aligned magnets. Thereby, the magnetisable plate is also aligned with the magnets. The first surface may be a surface of the hearing device aligned with the hearing device magnet and exposed to the environment. The first surface may be a surface of the charging device aligned with the charging device magnet and exposed to the environment.

In some embodiments, the magnetisable plate may comprise a first magnetisable plate in the charging device and a second magnetisable plate in the hearing device. Namely, one magnetisable plate is arranged in each of the hearing device and charging device. By arranging the magnetisable plate in both devices, the retaining force is increased. As the retaining force is increased it is possible to use smaller magnets than what is normally used. Thereby space is saved in both the hearing device and the charger, and the devices can be made smaller or saved space may be used for arranging other components. The first and second magnetisable plate may have the same size and may be made from the same material, as described above in relation to the magnetisable plate arranged to form part of one of the hearing device and charging device.

In a second aspect, a hearing device configured to be received and charged by a charging device is disclosed. The hearing device comprises a hearing device magnet and a receiving charging element. The hearing device magnet is configured for retaining the hearing device in the charging device when charging. The hearing device comprises a magnetisable plate. The magnetisable plate is arranged at a first hearing device surface where the hearing device magnet faces the charging device, when the hearing device is received in the charging device.

In a third aspect, a charging device configured for receiving and charging a hearing device is disclosed. The charging device comprises a charging device magnet and a supplying charging element. The charging device magnet is configured for retaining the hearing device in the charging device when charging. The supplying charging element is configured for performing the charging of the hearing device. The charging device comprises a magnetisable plate arranged at a first charger surface where the charging device magnet faces the hearing device, when the hearing device is received in the charging device.

The present disclosure relates to different aspects including the system described above and in the following, and corresponding system parts, i.e. the hearing device and charging devices each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 2 schematically illustrates an exemplary embodiment of (a) a system comprising a first and second hearing device, (b) a cross-section of a charging device cavity with the hearing device arranged therein;

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. Throughout, the same reference numerals are used for identical or corresponding parts.

Figure 1:
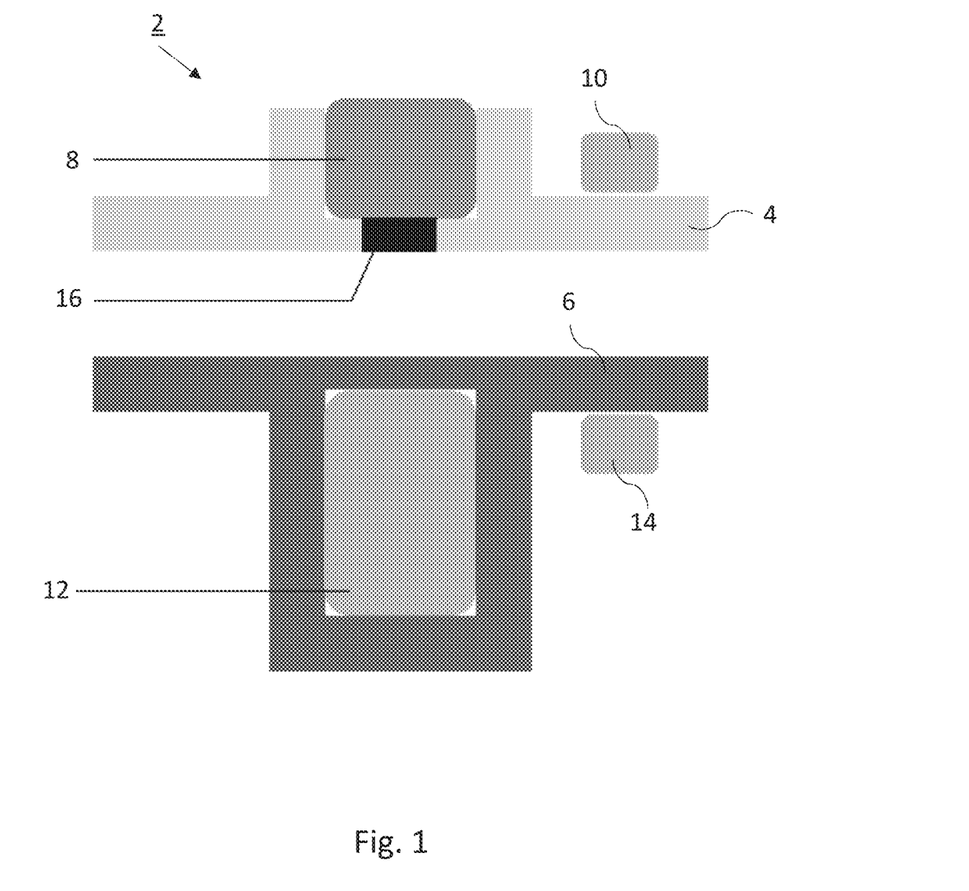
FIG. 1 schematically illustrates an exemplary embodiment of a hearing device/charger system.

FIG. 1 schematically illustrates an exemplary embodiment of a system 2 comprising a hearing device 4 and a charging device 6. The charging device 6 is configured for receiving the hearing device 4 and for charging the hearing device 4. The hearing device 4 comprises a hearing device magnet 8 and a receiving charging element 10. The charging device 6 comprises a charging device magnet 12 and a supplying charging element 14. The hearing device magnet 8 and the charging device magnet 12 are configured for retaining the hearing device 4 in the charging device 6 when charging. The supplying charging element 14 is configured for performing the charging of the hearing device 4. The system 2 comprises a magnetisable plate 16 provided between the hearing device magnet 8 and the charging device magnet 12, when the hearing device 4 is received in the charging device 6. In this schematic illustration of the system, the magnetisable plate 16 is forming part of the hearing device 4 and is arranged at a surface of the hearing device 4 facing the charging device 6.

Figure 2:
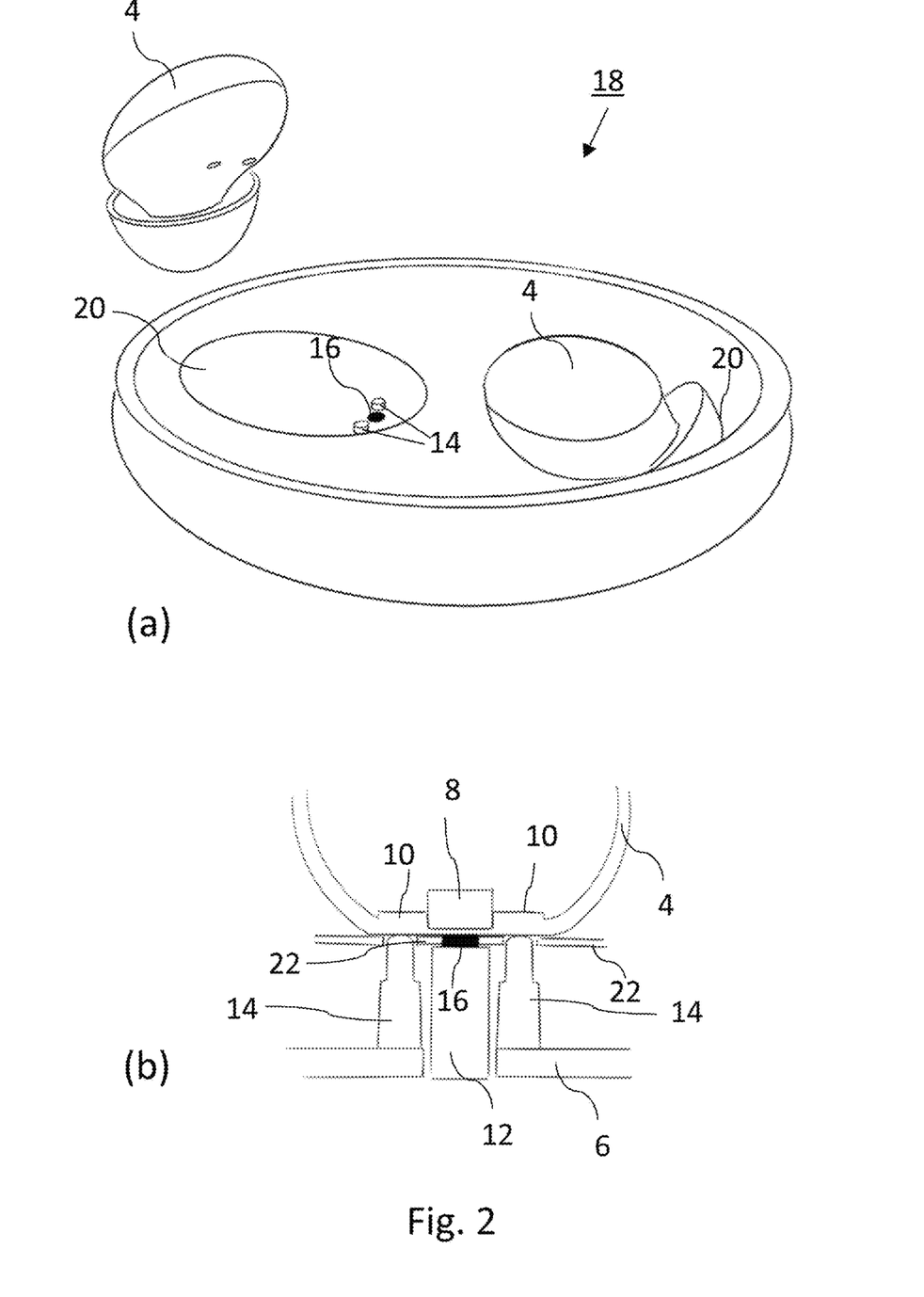

FIG. 2(*a*) schematically illustrates an exemplary embodiment of a system 18 comprising a first and second hearing device 4. FIG. 2 illustrates cavities 20 formed in the charging device 6 shaped to receive at least part of the hearing devices 4. In this embodiment, the charging device 6, i.e. the cavity 20 comprises a magnetisable plate 16 arranged such to be aligned with the magnets of the hearing device and the charging device (not visible). The cavity 20 also comprises a supplying charging elements 14 arranged on the sides of the magnet. The other cavity 20 may comprise the same features as the described cavity 20.

FIG. 2(*b*) illustrates a cross section of the cavity 20 with the hearing device 4 arranged therein. In the cross-section, the hearing device magnet 8 and the charging device magnet 12 are visible. In this embodiment, the supplying charging element is defined by two pogo pins 14, arranged in a close proximity to the receiving charging elements 10 of the hearing device 4. In an alternative embodiment, the pogo pins 14 can be replaced with one or more induction coils so that the hearing device is charged inductively. The magnetisable plate 16 is arranged at a surface where the hearing device 4 abuts the charging device 6 when received by the charger 6. The magnetisable plate 16 is arranged in the charging device 6 and has a smaller width than the charging device magnet 12. The charging device 6 comprise a non-magnetisable material 22 provided in the charging device 6, and arranged adjacent to the magnetisable plate 16. The non-magnetisable material 22 is in the form of a plate having the same thickness as the magnetisable plate 16. The non-magnetisable material 22 covers a portion of the magnet 12 which is not covered by the magnetisable plate 16 and is arranged adjacent to the magnetisable plate 16. The non-magnetisable material 22 may be a molded plastics material which forms the charger device 6. The non-magnetisable material does not disturb the magnetic field between the magnets 8 and 12. It may only serve to hold the magnetisable plate 16 in place. The magnetisable plate 16 may be arranged by removing a portion of the charging device case, i.e. the non-magnetisable material and then arranging the plate 16 in the space created by removing the portion of the charging device case. Therefore, the thickness of the magnetisable plate 16 may be determined by the thickness of the charger case in the proximity of the abutment area between the hearing device 4 and the charger 6.

Figure 3:
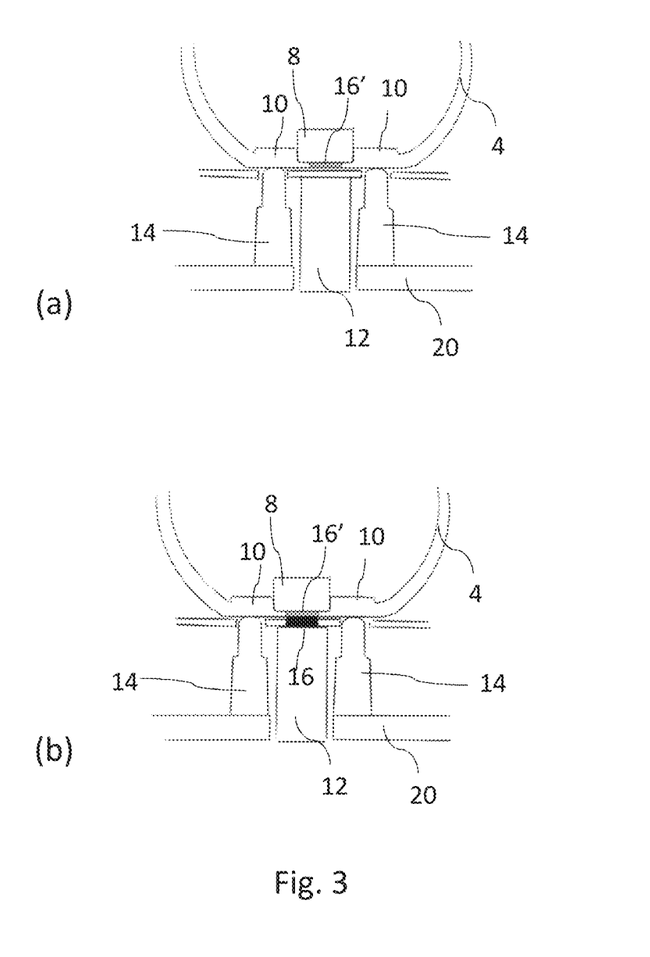
FIG. 3 schematically illustrates two exemplary embodiments of a cross-section of a charging device cavity with the hearing device arranged therein.

FIG. 3 schematically illustrates two exemplary embodiments of a cross-section of a charging device cavity 20 with the hearing device 4 arranged therein. Details described in relation to FIG. 2(*b*) are, to a great extent, the same as details shown in FIGS. 3 (*a*) and (*b*), and will, therefore, not be described here. The embodiment shown in FIG. 3(*a*) comprises a magnetisable plate 16' arranged in and forming part of the hearing device 4. The magnetisable plate 16' may be formed of the same magnetisable material as the magnetisable plate described in connection to FIG. 2(*b*). The magnetisable plate 16' may be arranged by removing a portion of the hearing device housing, which may be formed by a molded plastics material, i.e. a non-magnetisable material. The plate 16' is then arranged in the space created by removing the portion of the hearing device housing. Therefore, the thickness of the magnetisable plate 16' may also be determined by the thickness of the hearing device housing in the proximity of the abutment area between the hearing device 4 and the charger cavity 20. The embodiment shown in FIG. 3(*b*) comprises two magnetisable plates 16 and 16' arranged in both the hearing device 4 and the charger cavity 20 in the surface where the hearing device 4 abuts the charger cavity. The magnetisable plates 16 and 16' may be in a direct contact with the charging device magnet 12 and the hearing device magnet 8, respectively.

Figure 4:
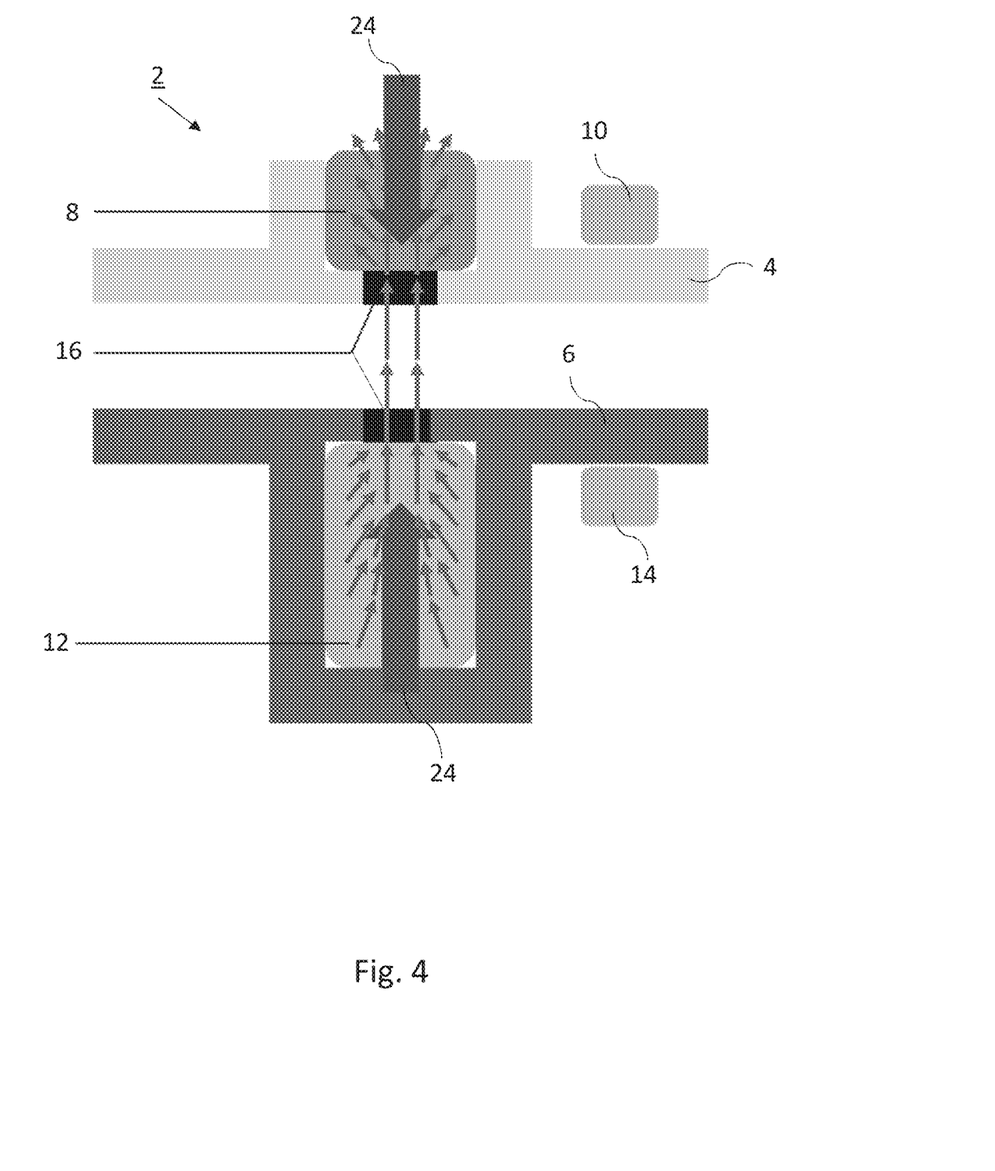
FIG. 4 schematically illustrates a direction of a magnetic force acting between the magnets of the hearing device/charger system.

FIG. 4 schematically illustrates a direction of a magnetic force acting between the magnets of the system 2. Details described in relation to FIG. 1 are, to a great extent, the same as details shown in FIG. 4, and will, therefore, not be described here. The system 2 shown in FIG. 4 additionally comprises one more magnetisable plate arranged in the charging device 6. The attraction magnetic force between the magnets 8 and 12 is indicated by arrows 24. Small arrows show how the magnetic field is focused in the by the magnetisable plates 16 and in the proximity of the contact surface between the hearing device 4 and the charger 6. The hearing device 4 and the charging device 6 are shown with an increased distance compared to an actual charging position for clarity purposes. During charging, the two devices 4 and 6 at least partly abut each other, and in particular at locations where the magnets are arranged.

Figure 5:
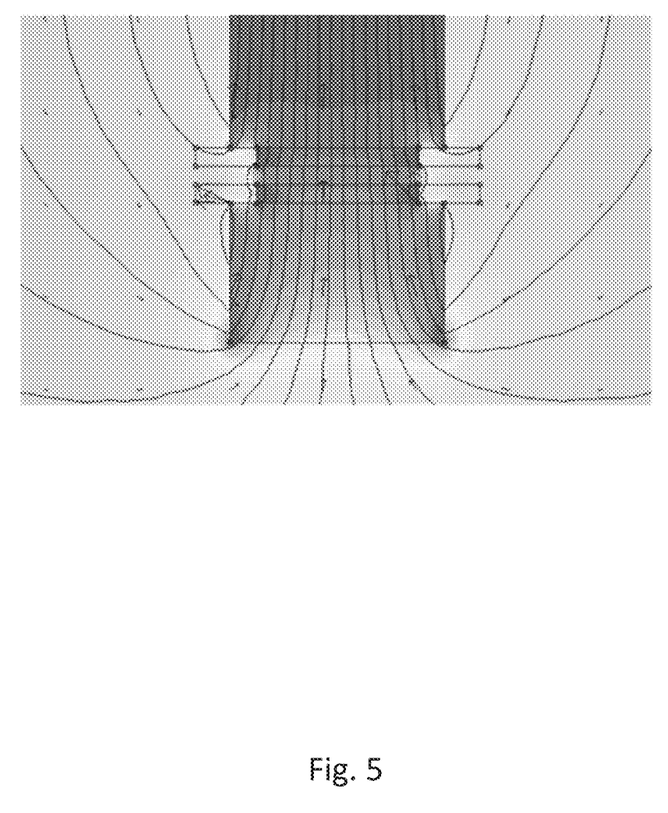
FIG. 5 schematically illustrates a magnetic field distribution between magnets of a hearing device/charger system.

FIG. 5 schematically illustrates a magnetic field distribution between magnets of a hearing device/charger system. It can be seen that the magnetic field is extended even in the area where one or two magnetisable plates are arranged. If the magnetisable plates are not arranged, and instead another, non-magnetisable material exists to protect the magnets, the magnetic field will be disrupted and greatly weakened. The magnetisable plates placed and dimensioned precisely greatly increase attraction force between the hearing device and charger during charging of the hearing device. The increased attraction force between the magnets provides a number of benefits for the charging system. Increased attraction force allows for size reduction of one or both magnets of the system what further allows for miniaturization of the devices or possibly adding additional functionalities to the system by utilizing space saved by the smaller magnets.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

Item 1. A system comprising a hearing device and a charging device, the charging device is configured for receiving the hearing device and for charging the hearing device,
- the hearing device comprises a hearing device magnet and a receiving charging element,
- the charging device comprises a charging device magnet and a supplying charging element;
- the hearing device magnet and the charging device magnet are configured for retaining the hearing device in the charging device when charging,
- the supplying charging element is configured for performing the charging of the hearing device;
- wherein the system comprises a magnetisable plate provided between the hearing device magnet and the charging device magnet, when the hearing device is received in the charging device.

Item 2. The system according to item 1, wherein the magnetisable plate is provided in the charging device.
Item 3. The system according to item 1 or 2, wherein the magnetisable plate is provided in the hearing device.
Item 4. The system according to any of the preceding items, wherein the magnetisable plate has a smaller width than the width of the hearing device magnet or the charging device magnet.
Item 5. The system according to any of the preceding items, wherein the magnetisable plate is configured to extend the magnetic field from the charging device magnet towards the hearing device magnet.
Item 6. The system according to any of the preceding items, wherein the magnetisable plate has a width in the range between 0.5-3 mm.
Item 7. The system according to any of the preceding items, wherein the magnetisable plate has a maximum relative magnetic permeability higher than 500.
Item 8. The system according to any of the preceding items, wherein the magnetisable plate is a ferritic stainless steel or a martensitic stainless steel.
Item 9. The system according to any of the preceding items, wherein the system further comprises a non-magnetisable material provided between the hearing device magnet and the charging device magnet, and arranged adjacent to the magnetisable plate.
Item 10. The system according to any of the preceding items, wherein the magnetisable plate is provided between the hearing device magnet and the charging device magnet by arranging the magnetisable plate at a first surface where the hearing device magnet and the charging device magnet are facing each other.
Item 11. The system according to any of the preceding items, wherein the magnetisable plate comprises a first magnetisable plate in the charging device and a second magnetisable plate in the hearing device.
Item 12. A hearing device configured to be received and charged by a charging device, the hearing device comprises a hearing device magnet and a receiving charging element,
   the hearing device magnet being configured for retaining the hearing device in the charging device when charging, and
   wherein the hearing device comprises a magnetisable plate, the magnetisable plate being arranged at a first hearing device surface where the hearing device magnet faces the charging device, when the hearing device is received in the charging device.
Item 13. A charging device configured for receiving and charging a hearing device,
   the charging device comprising a charging device magnet and a supplying charging element;
   the charging device magnet being configured for retaining the hearing device in the charging device when charging,
   the supplying charging element being configured for performing the charging of the hearing device;
   wherein the charging device comprises a magnetisable plate arranged at a first charger surface where the charging device magnet faces the hearing device, when the hearing device is received in the charging device.

LIST OF REFERENCES 2 hearing device/charger system
4 hearing device
6 charging device
8 hearing device magnet
10 receiving charging element
12 charging device magnet
14 supplying charging element
16 magnetisable plate
16' magnetisable plate
18 system with two hearing devices and a charger
20 charger cavity
22 non-magnetisable material
24 magnetic force direction

The invention claimed is:

1. A system comprising:
   a hearing device having a speaker; and
   a charging device configured for receiving the hearing device and for charging the hearing device;
   wherein the hearing device comprises a hearing device magnet and a receiving charging element, wherein the hearing device magnet and the speaker are separate respective components of the hearing device;
   wherein the charging device comprises a charging device magnet and a supplying charging element;
   wherein the hearing device magnet and the charging device magnet are configured to retain the hearing device with respect to the charging device;
   wherein the supplying charging element is configured to provide power for charging the hearing device;
   wherein the system further comprises a magnetisable plate, and wherein at least a part of the magnetisable plate is between the hearing device magnet and the charging device magnet, when the hearing device is received by the charging device.

2. The system according to claim 1, wherein the magnetisable plate is a part of the charging device.

3. The system according to claim 1, wherein the magnetisable plate is a part of the hearing device.

4. The system according to claim 1, wherein the magnetisable plate has a smaller width than a width of the hearing device magnet or a width of the charging device magnet.

5. The system according to claim 1, wherein the magnetisable plate is configured to extend a magnetic field from the charging device magnet towards the hearing device magnet.

6. The system according to claim 1, wherein the magnetisable plate has a width that is anywhere from 0.5-3 mm.

7. The system according to claim 1, wherein the magnetisable plate has a maximum relative magnetic permeability higher than 500.

8. The system according to claim 1, wherein the magnetisable plate comprises a ferritic stainless steel or a martensitic stainless steel.

9. The system according to claim 1, further comprising a non-magnetisable material between the hearing device magnet and the charging device magnet, wherein the magnetisable plate and the non-magnetisable material are in a side-by-side configuration.

10. The system according to claim 1, wherein the hearing device magnet is configured to be in contact with the magnetisable plate.

11. The system according to claim 1, wherein the magnetisable plate is made from metal.

12. A system comprising:
   a hearing device having a speaker; and
   a charging device configured for receiving the hearing device and for charging the hearing device;
   wherein the hearing device comprises a hearing device magnet and a receiving charging element;
   wherein the charging device comprises a charging device magnet and a supplying charging element;

wherein the hearing device magnet and the charging device magnet are configured to retain the hearing device with respect to the charging device;

wherein the supplying charging element is configured to provide power for charging the hearing device;

wherein the system further comprises a magnetisable element, and wherein at least a part of the magnetisable element is between the hearing device magnet and the charging device magnet, when the hearing device is received by the charging device; and wherein the hearing device magnet forms no part of the speaker of the hearing device.

13. The system according to claim 12, wherein the magnetisable element is a part of the charging device.

14. The system according to claim 12, wherein the magnetisable element is a part of the hearing device.

15. The system according to claim 12, wherein the magnetisable element has a smaller width than a width of the hearing device magnet or a width of the charging device magnet.

16. The system according to claim 12, wherein the magnetisable element is configured to extend a magnetic field from the charging device magnet towards the hearing device magnet.

17. The system according to claim 12, wherein the magnetisable element has a width that is anywhere from 0.5-3 mm.

18. The system according to claim 12, wherein the magnetisable element has a maximum relative magnetic permeability higher than 500.

19. The system according to claim 12, wherein the metal of the magnetisable element comprises a ferritic stainless steel or a martensitic stainless steel.

20. The system according to claim 12, further comprising a non-magnetisable material between the hearing device magnet and the charging device magnet, wherein the magnetisable element and the non-magnetisable material are in a side-by-side configuration.

* * * * *